(12) United States Patent
Willinger et al.

(10) Patent No.: US 7,837,403 B2
(45) Date of Patent: Nov. 23, 2010

(54) SHAMPOOING BRUSH

(75) Inventors: Jonathan Willinger, Tenaffy, NJ (US); Ryan Rutherford, Rutherford, NJ (US)

(73) Assignee: J.W. Pet Company, Inc., Teterboro, NJ (US)

( * ) Notice: Subject to any disclaimer, the term of this patent is extended or adjusted under 35 U.S.C. 154(b) by 1005 days.

(21) Appl. No.: 11/291,520

(22) Filed: Dec. 1, 2005

(65) Prior Publication Data
US 2006/0133886 A1    Jun. 22, 2006

Related U.S. Application Data

(60) Provisional application No. 60/632,243, filed on Dec. 1, 2004.

(51) Int. Cl.
*B43M 11/06* (2006.01)
(52) U.S. Cl. .................. 401/184; 401/206; 401/270; 401/278; 119/603
(58) Field of Classification Search .......... 401/270, 401/272–274, 278, 279, 152, 156, 188 R, 401/280, 282–284, 286, 288, 183–186, 187, 401/268; 215/11.4, 260; 132/112–115; 119/603, 119/604
See application file for complete search history.

(56) References Cited

U.S. PATENT DOCUMENTS

| | | | | |
|---|---|---|---|---|
| 1,865,850 A | * | 7/1932 | Garvey | 401/184 |
| 1,936,724 A | * | 11/1933 | Giacomo | 401/188 R |
| 2,517,152 A | * | 8/1950 | Wilson | 401/27 |
| 2,930,060 A | * | 3/1960 | Pearce | 401/184 |
| 4,955,746 A | * | 9/1990 | Craigmile | 401/131 |
| 4,998,633 A | * | 3/1991 | Schneider | 215/311 |
| 5,071,017 A | * | 12/1991 | Stull | 215/260 |
| 5,390,805 A | * | 2/1995 | Bilani et al. | 215/260 |
| 5,454,659 A | * | 10/1995 | Vosbikian et al. | 401/207 |
| 6,112,951 A | * | 9/2000 | Mueller | 222/490 |
| 6,210,064 B1 | * | 4/2001 | White et al. | 401/279 |
| 6,287,037 B1 | * | 9/2001 | Hay | 401/273 |
| 6,315,478 B1 | * | 11/2001 | Atkins | 401/183 |
| 6,623,201 B2 | * | 9/2003 | Brumlik | 401/279 |
| 6,629,799 B2 | * | 10/2003 | Flores, Jr. | 401/270 |
| 6,910,607 B2 | * | 6/2005 | Gaiser et al. | 222/490 |
| 7,041,246 B2 | * | 5/2006 | Fillmore | 264/154 |
| 7,077,296 B2 | * | 7/2006 | Brown et al. | 222/185.1 |
| 2003/0031501 A1 | * | 2/2003 | Eadie | 401/290 |

* cited by examiner

*Primary Examiner*—Gregory L Huson
*Assistant Examiner*—Keegan Gumbs
(74) *Attorney, Agent, or Firm*—Katten Muchin Rosenman LLP

(57) ABSTRACT

A brush is configured with a housing provided with spaced apart inlet and outlet port units. The outlet unit controllably discharges fluid, which fills a chamber, formed within the housing through the inlet port and is pressurized therein in response to an external force applied to the inlet port unit.

11 Claims, 11 Drawing Sheets

SHAMPOOING BRUSH

RELATED APPLICATIONS

This application is the non-provisional counterpart and claim priority to U.S. Provisional Application 60/632,243 filed on Dec. 1, 2004, which is hereby incorporated by reference in its entirety for all purposes.

BACKGROUND OF THE INVENTION

1. Field of the Invention

This invention relates to distributors of fluids. In particular, this invention relates to scrubbing brushes configured to store and dispense fluids during use.

2. Background of the Invention

Eliminating objectionable odors and reducing the incidence of dandruff, rain rot, and other skin disorders in pets are a necessary practice in good animal stewardship. A great variety of soaps, fluid medications, shampoos, and detergents, used in this practice, are readily available. Typically, fluids are stored in a container. Once fluid is applied to the surface, users distribute the fluid over the surface of an animal either by their hands or by means of bathing aids.

Whether dishwashing or bathing, surfaces to be treated are typically wetted before treating fluids are applied to the wetted surfaces. As a rule, when fluids are utilized for cleaning and/or bathing the animal's hair and skin, the entire animal's coat should be initially wetted. Otherwise, dry portions of the coat will not be effectively treated, and the animal's skin will not be cleaned and/or medicated.

When using bathing aides such as brushes, it is frequently necessary to interrupt scrubbing to apply treating fluids. As a result the entire process may be inefficient. Moreover, the animals may become impatient and unmanageable due to these interruptions. To overcome these drawbacks, fluid reservoirs and/or sponges are known to have been integrated into brush designs. When these brushes are used, the brush is squeezed to force fluid out of the sponge and/or reservoir. The fluids are then usually conveyed through hollow bristles to the surface being treated.

However, hollow bristles are often plugged by dirt or debris from the animal or particulates within the fluid. If a sealed reservoir is present, suction is often generated during use, thereby preventing the fluid from exiting the reservoir for use.

It is known that to ameliorate the concerns associated with hollow-bristle structures, brush heads that are configured to allow flow from a liquid-containing chamber not through bristles are known. There is at least one outlet port disposed between the bristles. A valve provided over the outlet port in the fluid-containing chamber opens in response to an external pressure to allow evacuation of the fluid from the chamber and closes upon ceasing the external pressure. A mechanical linkage assembly extending between the inlet and outlet ports of the chamber is displaceable in response to the external pressure from an initial position, in which the valve closes the outlet port, to an operating position, in which the linkage assembly forces the valve to open the outlet port.

While clogging of the bristles does not occur, the structure of the linkage assembly may malfunction. Furthermore, the linkage includes a few interacting components and is, thus, complicated and time-consuming to manufacture. As a result, the entire brush may be cost-prohibitive.

Thus, a need exists for brushes that have a simple, reliable and cost-efficient structure allowing the user to apply fluids to surfaces to be treated without, however, interrupting scrubbing these surfaces.

Another need exists for brushes that are provided with a fluid flow-control component coupled to the outlet port and capable of being actuated by fluid upon establishing the desirable fluid pressure within a fluid-containing chamber.

A further need exists for improved fluid distribution techniques for use in brushes.

SUMMARY OF THE INVENTION

The present invention is directed to brush units that satisfy the enumerated needs. The invention includes delivering fluid onto a surface to be treated without interrupting a bathing, grooming or scrubbing process and wherein the amount of the need for fluid delivered onto the animal's coat is determined by a user. The user applies an external pressure to a fluid-containing housing. Consequently, the internal pressure of fluid within the housing rises to the extent sufficient to open a valve covering the outlet port of the housing. The fluid is forced to traverse the open outlet port and reaches the surface to be treated as long as the desired internal pressure is sustained. Upon ceasing the external pressure, the valve returns to its closed position preventing further egress of the fluid from the housing. While delivering the fluid onto the surface to be treated, the user may continue displacement of the brush along the surface thereby distributing the delivered fluid over a large area.

A brush unit in accordance with the invention includes a housing provided with spaced apart inlet and at least one outlet port. Fluid is delivered into the housing through the inlet port and serves as an actuator for opening the valve covering the outlet port in response to applying an external pressure to the housing.

The brush unit is further provided with a bladder made from flexible material capable of deforming in response to the external pressure. Depressing the bladder reduces the inner volume of the housing causing the internal pressure of fluid to increase to the desired extent sufficient to open the valve.

Preferably, the bladder is removably mounted adjacent to the housing so as to cover the inlet port. Alternatively, the bladder may be provided integrally with the housing and spaced at a distance from the inlet port. The inlet port may have a removable lid to allow the user to periodically fill the housing with fluid.

The valve can be removably or permanently inserted within the outlet port of the housing. Configuration of the valve may include a membrane provided with at least one slit dividing the membrane into multiple segments. In the absence of the desired internal pressure, the segments are sealingly attached to one another preventing fluid from voluntary escaping the housing. Upon building up the desired internal pressure, the segments elastically yield to this pressure. As a result, the segments of the membrane flex away from one another to allow fluid to traverse a passage leading to the surface to be treated.

The brush unit is further configured with a brush head having a plurality of bristles. The outlet port of the brush unit opens into the brush head. Preferably, the brush head is removably mounted to the housing. However, the brush head may be fixed to the housing.

The housing of the brush unit is ergonomically configured to provide the user with maximum comfort during use. While numerous shapes are contemplated within the scope of the invention, preferably, the housing is dome-shaped to fit the shape of the user's palm when the user holds the brush unit. Similarly, the housing is preferably dimensioned so as to provide a comfortable grip for the user The housing may be made from a variety of materials. Preferably, however, engineering polymeric materials are used for manufacturing the inventive brush unit. As a result, manufacturing the brush unit may include any suitable molding technique. The housing can be molded as a one-piece body. Preferably, the housing includes two components attachable to one another to define the dome shape and being flow-isolated from one another. One of the components includes a chamber for storing fluid and is preferably made from transparent material allowing the user to see the level of fluid within the chamber.

The brush assembly in accordance with the invention has a simple structure and is both easy to manufacture and reliable in use. Components of the brush assembly that may wear out in time can be easily replaced to prolong a useful life of the inventive brush.

These and other features and aspects of the present invention will be better understood with reference to the following description and figures.

DETAILED DESCRIPTION

Figure 1:
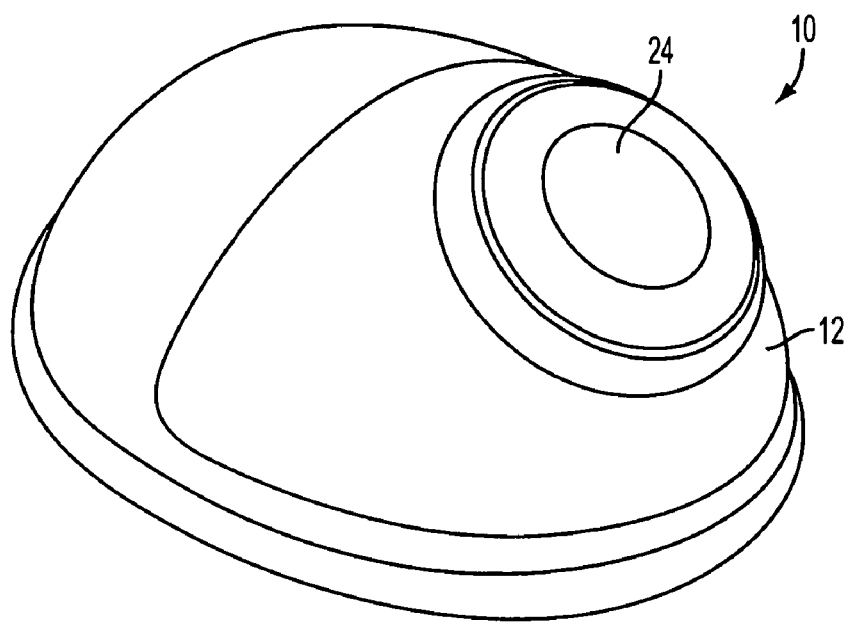
FIG. 1 is a perspective view of assembled brush unit configured in accordance with the invention.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, inner, outer, above, below, beneath, rear, and front may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices. Additionally, the terms "brush" and "brush unit" are used interchangeably.

Figure 1A:
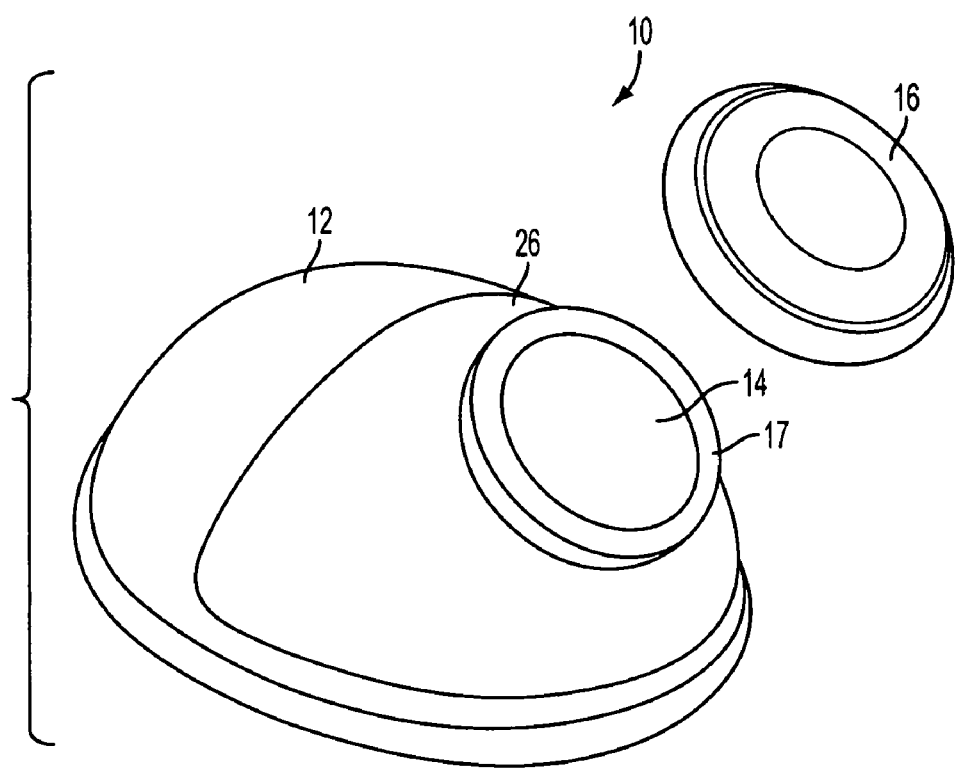
FIG. 1A is a perspective view of the brush unit illustrated in FIG. 1 with a lid, which is configured to cover an inlet port, removed from the housing of the brush unit.

Referring more particularly to the drawings, FIGS. 1 and 1A illustrate an assembled brush unit 10 configured with a housing 12. While the housing is illustrated as having a dome-like shape, it can have a variety of shapes subject only to ergonomic requirements. For example, the housing has to fit comfortably the user's hand. Furthermore, it is desirable that the dimensions of housing 12 are so selected that the housing is neither too small nor too large. Preferably, the upper surface of housing 12 extends along the entire length of the user's palm and terminates under the user's fingers adjacent to a bladder 24.

Turning to FIGS. 2A-2G, 3 and 5 in addition to FIGS. 1 and 1A, fluid selected from the group, which may include, but are not limited to, shampoo, hair conditioner, flea treatment, soap and/or dishwashing liquid, is delivered into housing 12 through an inlet port 14. Inlet port 14 may be variously shaped and dimensioned. Preferably, inlet port 14 includes a circular opening provided in a flange 26 (FIG. 1A), which extends outwards from housing 12. An outer wall 17 (FIG. 1A) of flange 26 may threadingly engage an inner thread of a lid 16, which, thus, can be detachably coupled to flange 26.

Alternatively, dimensions of lid 16 and flange 26 may be selected so that lid 16 is pushed onto flange 26 for a tight fit thus eliminating the need for threads on the opposing surfaces of flange 26 and lid 16, respectively. Other types of connection, such as a bayonet connection, are also contemplated within the scope of this invention. Lid 16 and flange 26 are configured to be removably coupled to one another in a fluidproof manner for preventing voluntary escape of fluid from housing 12 regardless of the position of brush unit 10.

Lid 16 includes a cup-shaped body 28 (FIGS. 2B, 3) formed with a central opening 28A configured to receive bladder 24 made from flexible material. The outer diameter of the bladder 24 is slightly greater than the diameter of the central opening. As a consequence, bladder 24, when pushed through the opening of a ring-shaped body 28 of lid 16, tightly fits the peripheral wall of opening 28A in a manner preventing fluid from escaping housing 12. To ensure imperviousness of lid 16, the bladder is provided with a radial lip 25 (FIG. 3) pressing against an underside 27 of lid 16 upon attaching the bladder to the lid. As mentioned above, bladder 24 is disposed over inlet port 14 that in turn is preferably positioned under the user's fingers. The user presses bladder 24 whenever a situation requires an additional amount of fluid.

The interior of housing 12 is formed as a chamber in fluid communication with inlet port 14 for receiving and storing fluid. Housing 12 may be formed as a one-piece component with the chamber defined by the inner peripheral surface of the housing' wall between the dome-shaped top and bottom of the housing. In accordance with a further modification, housing 12 is configured with two housing portions 20 and 60 (FIGS. 2-3), only one of which is formed with the inlet port 14 and the chamber.

Figure 2A:
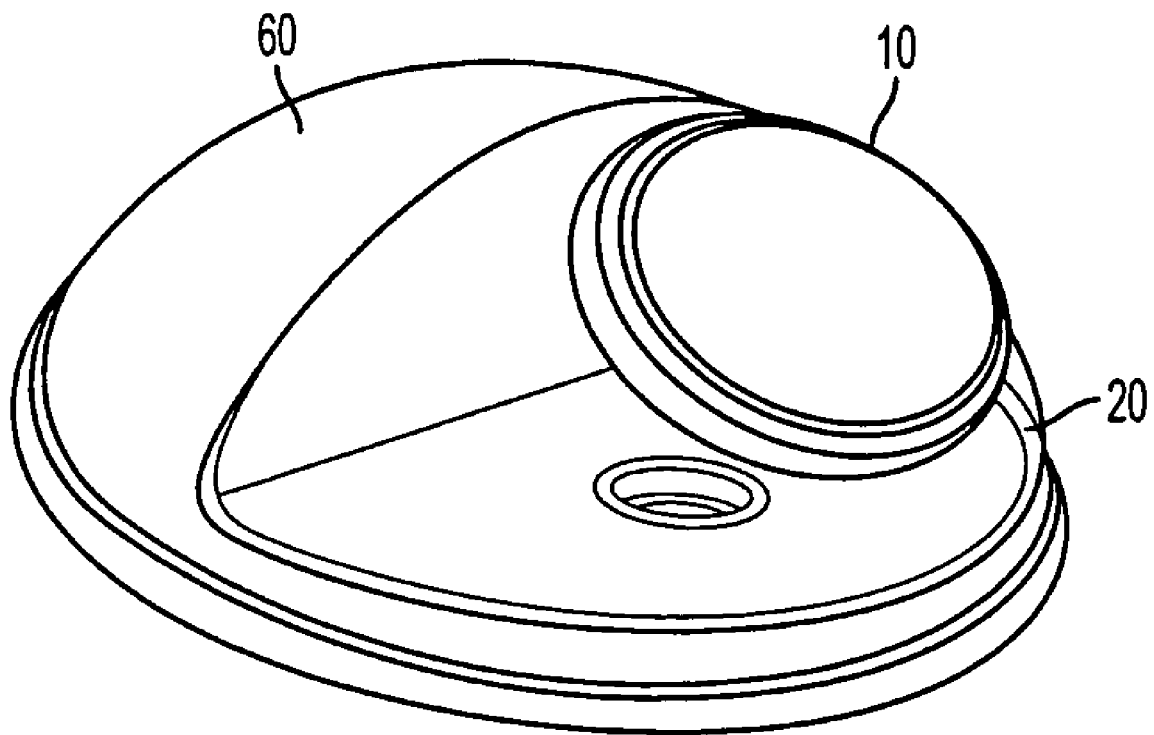
FIGS. 2A-2G are exploded top perspective views of the inventive brush illustrated at different stages of its assembly.
Figure 2B:
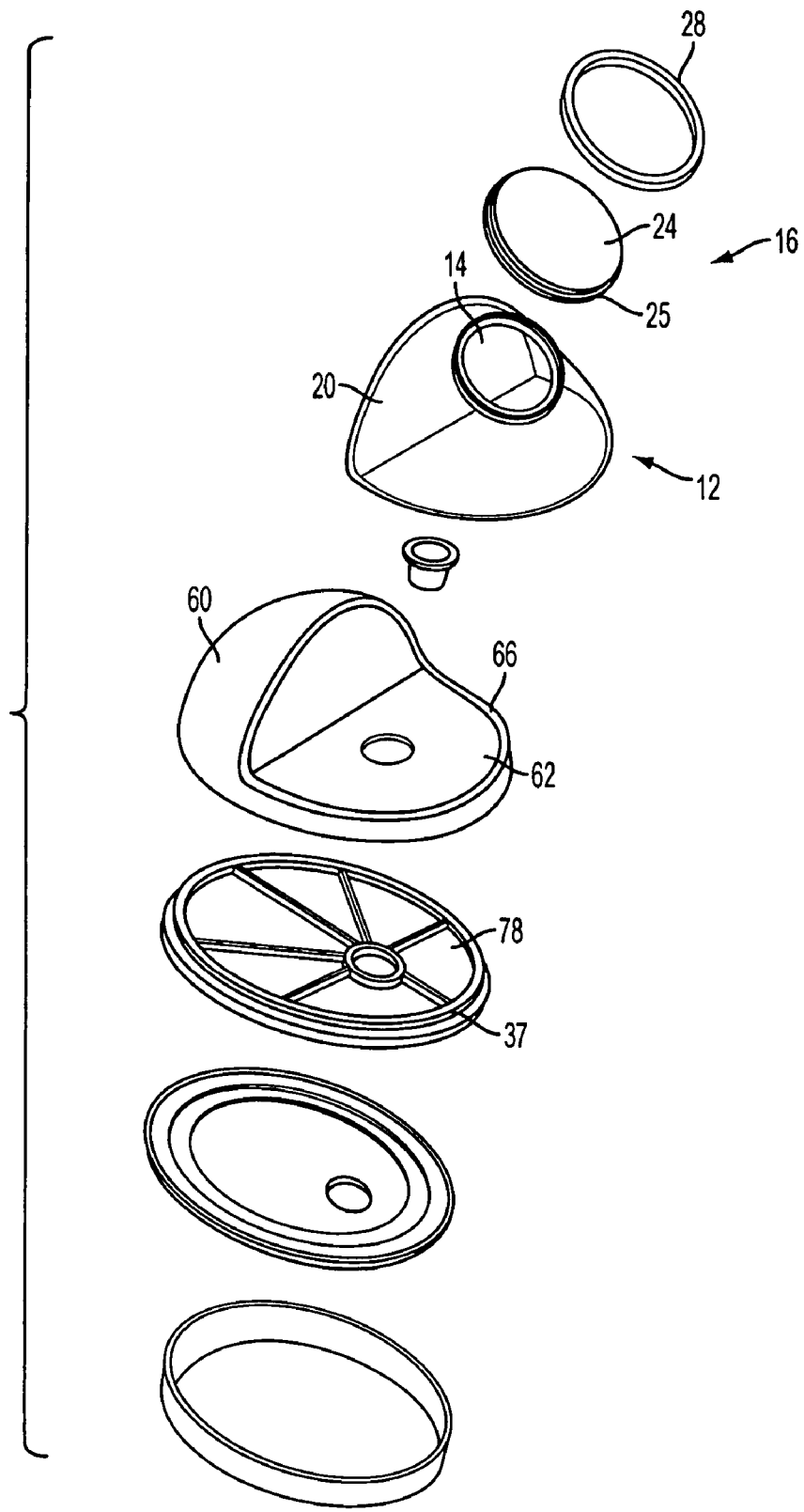
Figure 2C:
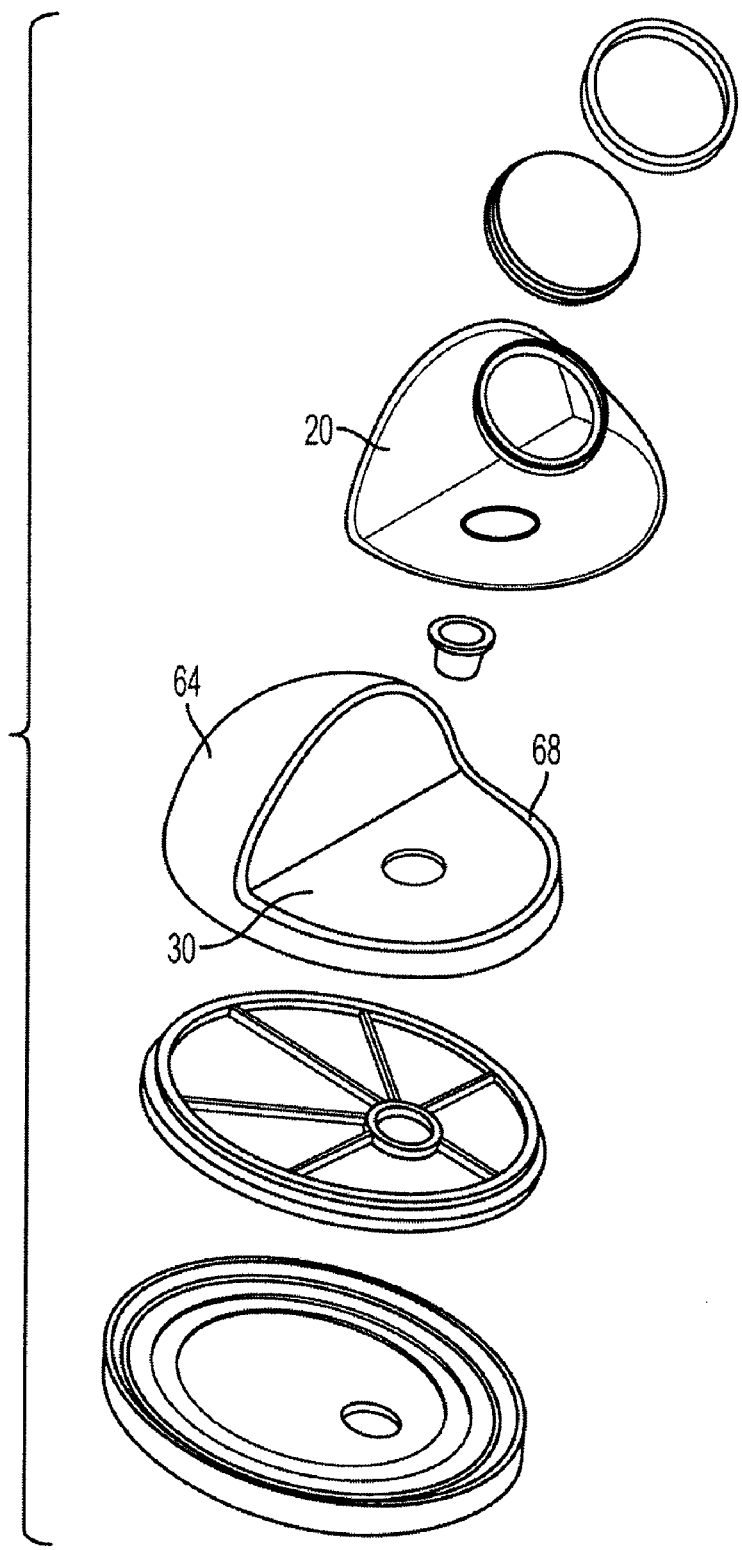

Base portion 60 of housing 12 is configured with a bottom 62 (FIG. 2A) and a top 64 (FIG. 2B). Top 64 does not continuously cover the entire bottom 62, but has a cutout region 30 (FIG. 2C). Top 64 is so cutout that a front area 66 of the bottom 62 (FIG. 2B) has a flange 68 (FIGS. 2C, 3) extending upwards from the bottom and along the periphery of the entire front area 66. Accordingly, base portion 60 has an inner surface including the inner side of flange 68 and the underside of top 64.

Hollow portion 20 of the housing is configured so that, upon coupling portions 20 and 60, the outer surface of portion 20 smoothly extends from the outer surface of top 64 and flange 68 of base portion 60 (FIG. 3) without steps or substantial gaps. The inner surface of hollow portion 20 is substantially continuous except for a flange 70 (FIGS. 2E, 3) provided in the bottom of portion 20 and the opening provided within flange 26 and defining inlet port 14. Thus, the interior of portion 20 defines a chamber for receiving and storing fluid. Flange 70 opening into the chamber and extending downwards from the bottom of portion 20 has an inner surface defining a passage for fluid that is forced through the outlet port.

Figure 2D:
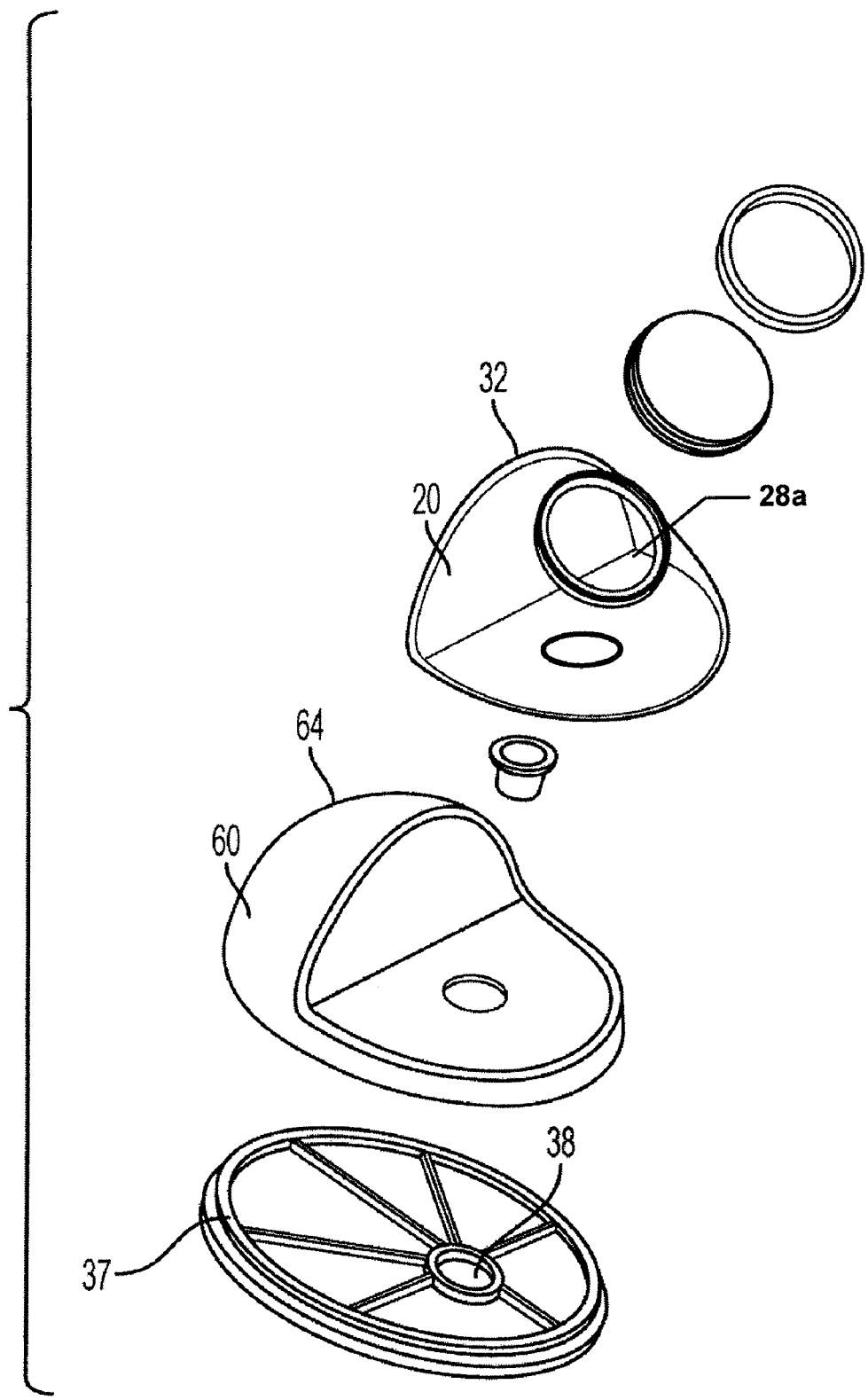
Figure 2E:
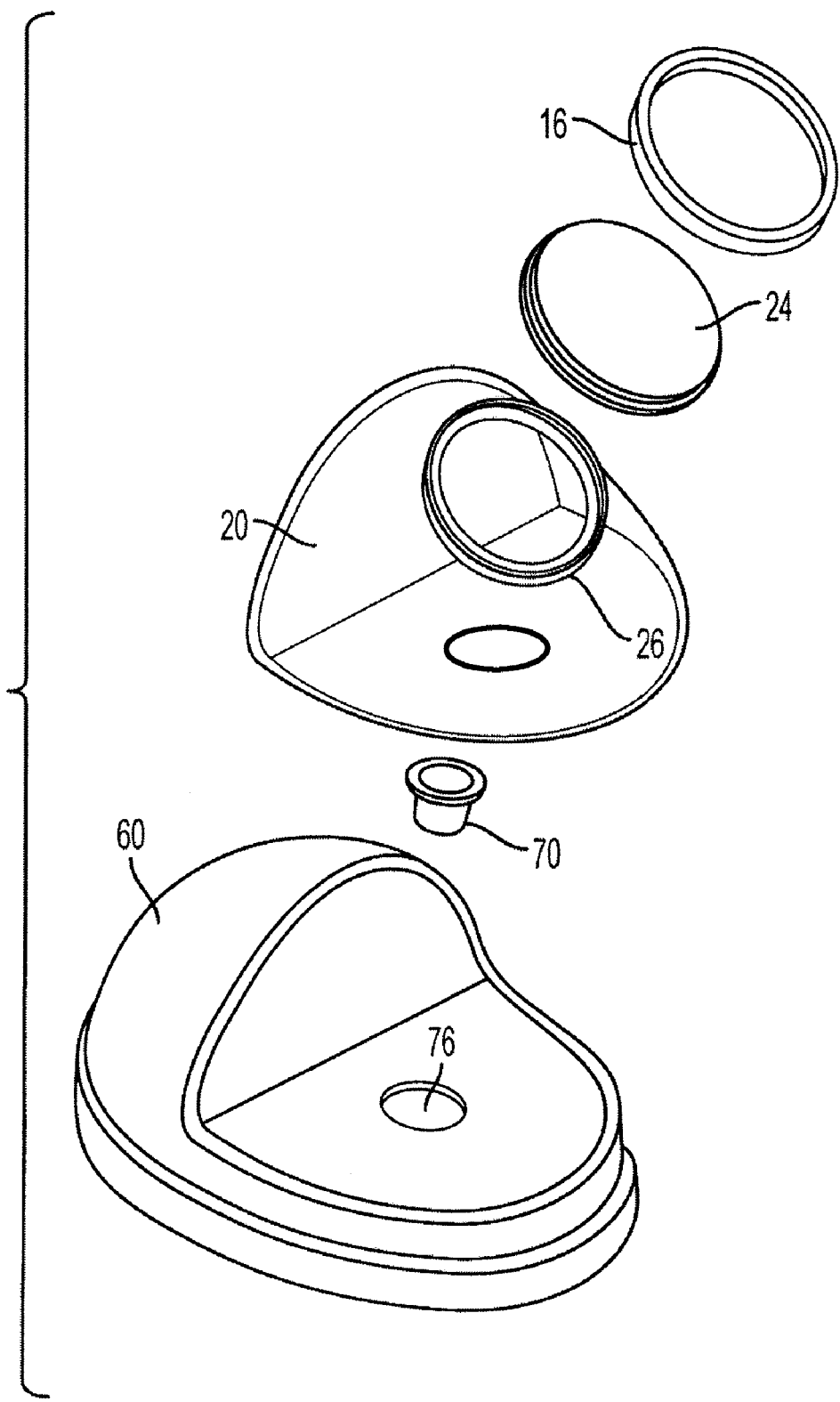
Figure 2F:
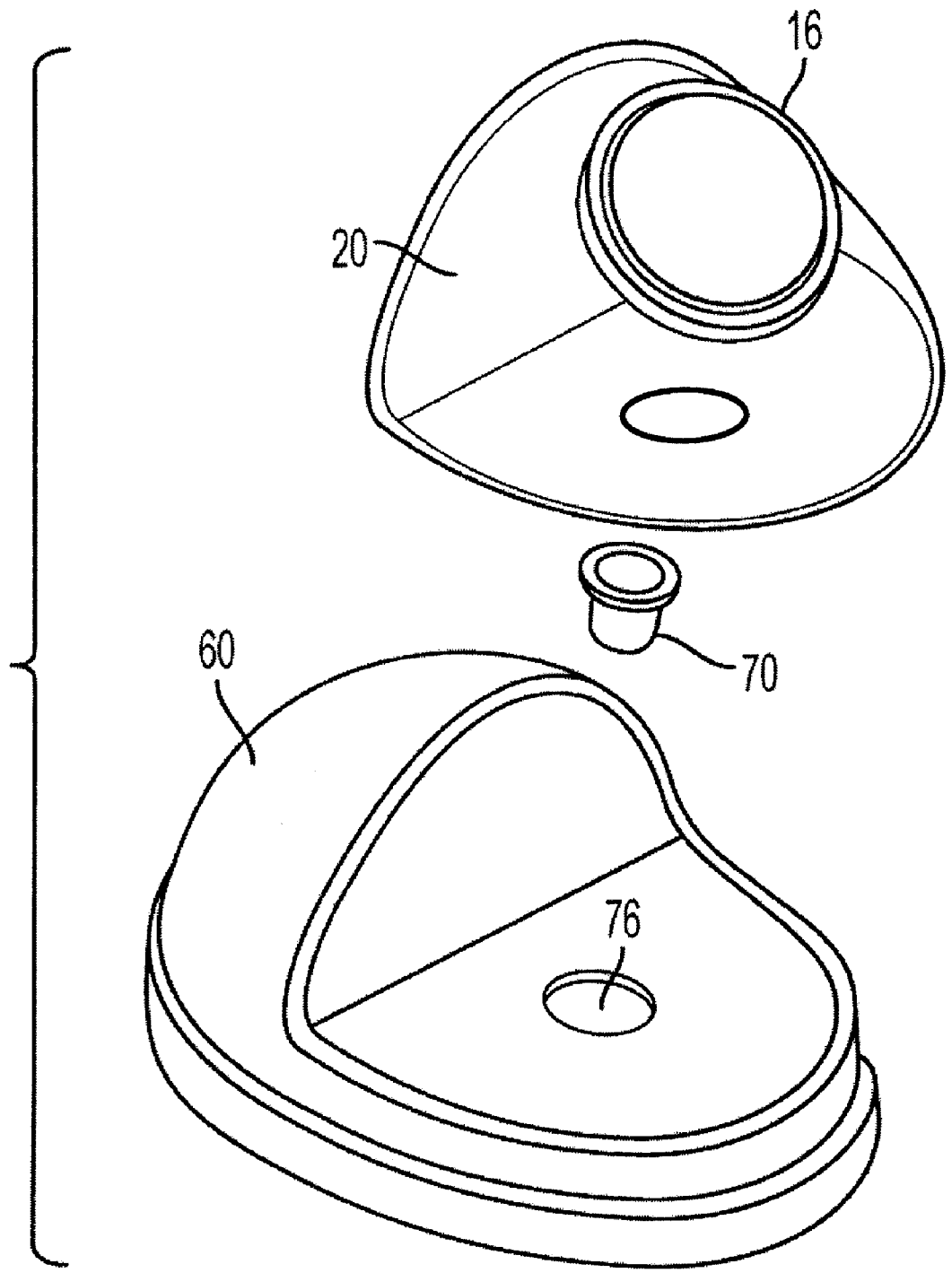
Figure 2G:
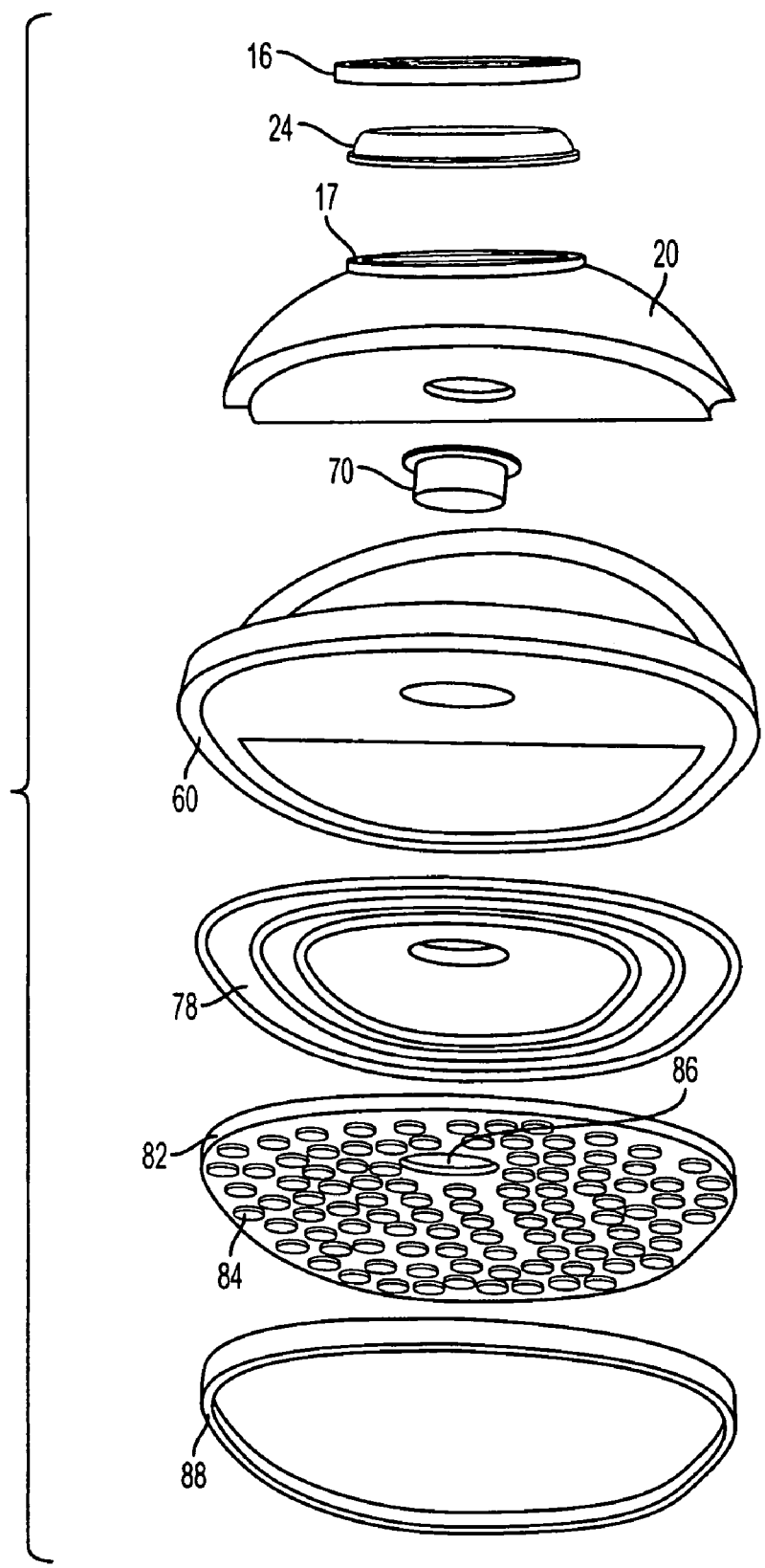

Housing portions 20 and 60 may be coupled in numerous ways. For example, the geometry of the peripheral wall of portion 20 may be configured so that a region 32 (FIG. 2D)

connecting the top and rear wall of portion 20 engages a receiving surface of the top 64 of base portion 60. Similarly, a bottom edge 36 (FIG. 3) of the peripheral wall of portion 20 frictionally slides against a receiving surface of the flange 68 of base portion 60. Pushing housing portions 20 and 60 towards one another provides reliable engagement between the contacting surfaces of the housing portions. As a result, the housing 12 has a smooth outer surface conveniently fitting the hand of the user while using brush 10. Alternatively, opposing surfaces of housing portions 20 and 60 may be provided with a plurality of matching projections and recesses. For example, portion 20 may have a plurality of spaced apart projections configured to frictionally move into respective recesses formed on the peripheral edge of base portion 60. Conversely, the projections can be provided on base portion 60, whereas the recesses are located on portion 20.

Flange 70, provided in the top portion 20, is aligned with and extends through a hole 76 (FIG. 2F) formed in front area 66 of bottom 62 of base portion 60. Hole 76 is somewhat larger than the outer diameter of flange 70 and, thus, defines a groove 77 (FIG. 3) within bottom 62 of base portion 60 configured to receive an inner end of the cover for a valve assembly, as will be explained in detail hereinafter.

Housing 12 is completed with a tray 78 (FIG. 2B) juxtaposed with and coupled to the outer side of the bottom 62 of the housing base portion 60. Tray 78 is configured so that its edge 37 surrounds the bottom of base portion 60 and forms a continuous peripheral ledge 34 (FIG. 3) extending laterally outwards from housing 12. Preferably, the brush 10 is made from various polymeric materials. Accordingly, using numerous molding techniques, base portion 60 and tray 78 may be manufactured as a unitary part, or, of course, these components may be manufactured separately and later coupled to one another, as shown in FIG. 2A. Tray 78 has a respective hole 38 (FIG. 2B) aligned with flange 70 and having an inner diameter substantially the same as hole 76 of bottom 62 of the housing's base portion 60.

A brush head 82 (FIGS. 2G, 3) is coupled to housing 12 and has a plurality of bristles 84. Each bristle 84 may have a pin-shape 84a, which has a base 84b that is wider than its tip 84c. The tip may be rounded. Each bristle 84 comprises a single solid structure. Bristles 84 may be made of rubber. The brush head and bristles comprise a unitary structure. To complete the outlet port of brush 10, brush head 82 is provided with a hole 86 also aligned with the holes of the housing 12 during assembly of the brush 10. The brush head 82 may be removably attached to the housing 12. Due to its elasticity, the brush head may be stretched over ledge 34 so that flange 88 (FIG. 3) is engaged with ledge 34 formed by edge 37 of tray 78. To prevent brush head 82 from dislodging during usage, the opposing surfaces of brush head 82 and tray 78 may be glued together. Alternatively, the inner side of brush head 82 may have one or a plurality of suction cups engaging the opposing outer surface of tray 78. Furthermore, brush head 82 may be simply screwed on housing 12.

Figure 3:
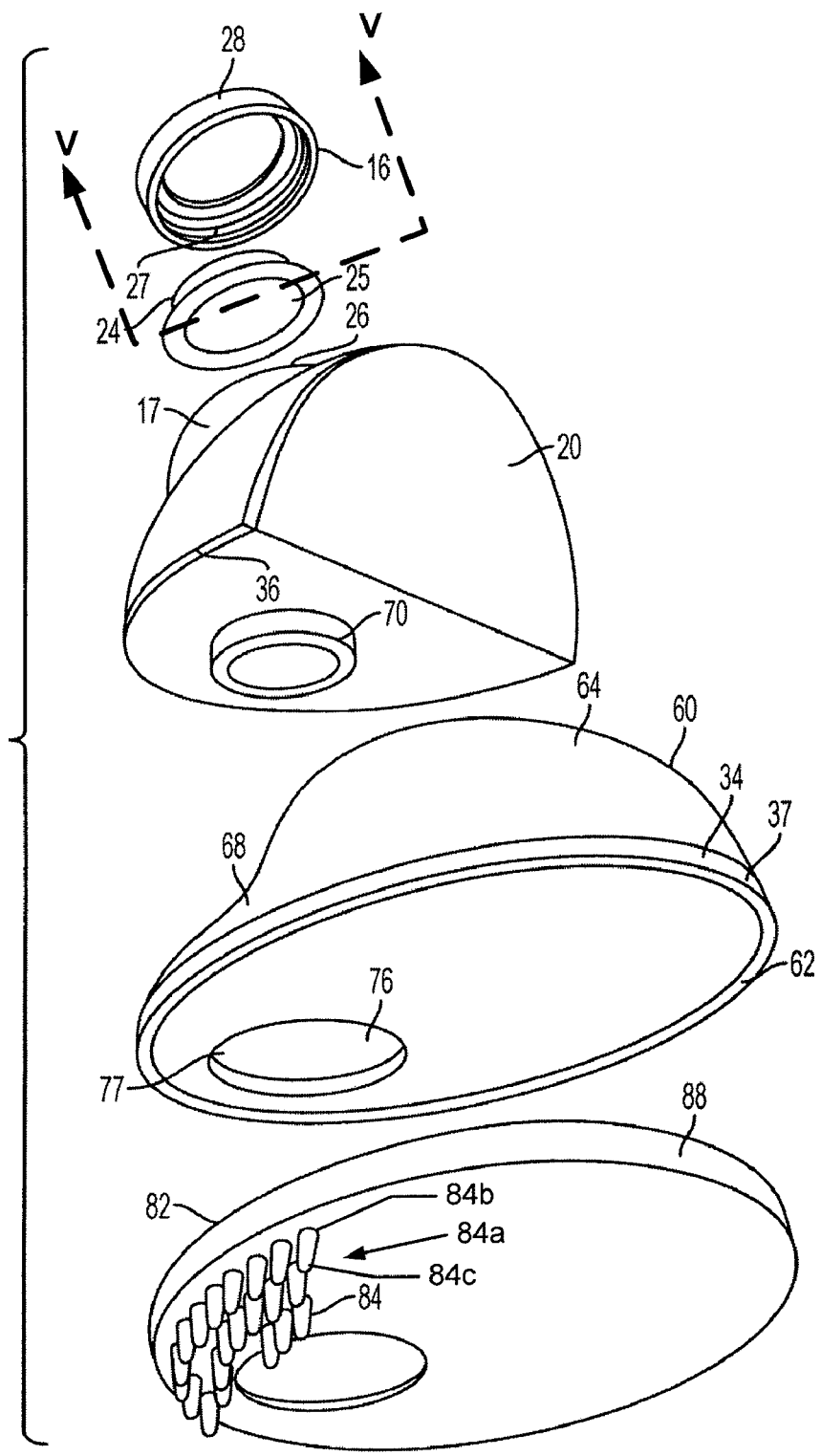
FIG. 3 is an elevated exploded bottom view of the brush unit of FIG. 1.
Figure 4:
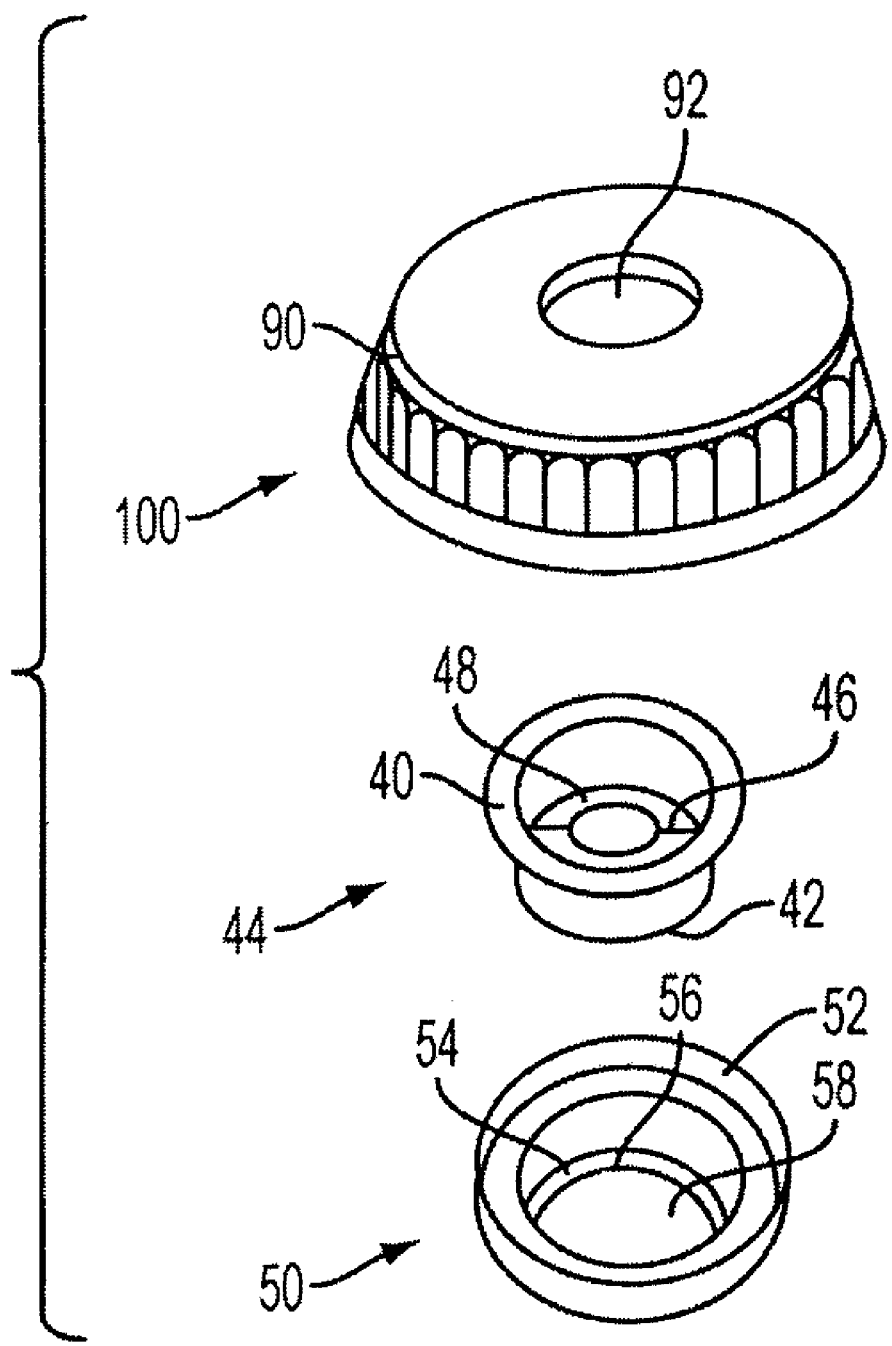
FIG. 4 is an exploded top view of the valve assembly utilized in the inventive brush unit and shown in association with the exploded view of the brush of FIG. 3.
Figure 4:
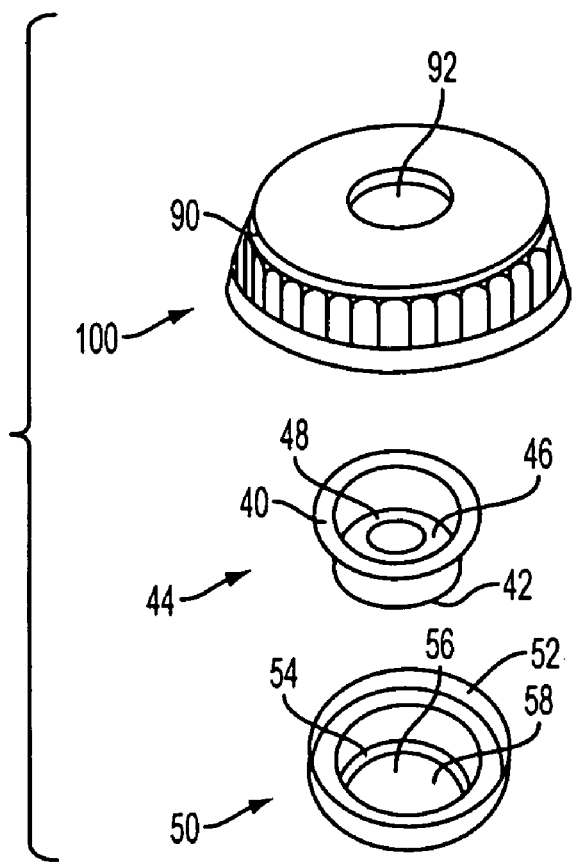
Figure 5:
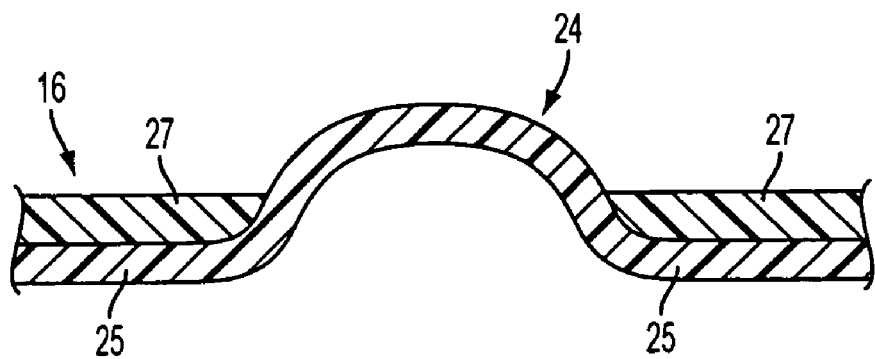
FIG. 5 is a cross-section view of FIG. 4 taken along lines V-V, as is shown in FIG. 4.

Preferably, all components of brush unit 10 are made from polymeric materials, such as engineering plastics, rubber and the like. However, the modulus of elasticity of materials used for manufacturing different components of brush 10 is not uniform. For example, housing 12 may be made from rigid polymeric materials incapable of yielding to loads produced by the user. Bladder 16 and brush head 82, in turn, are composed of flexible polymeric materials, such as rubber. However, the brush head may be made from relatively rigid polymeric material. Housing portion 20 configured with fluid chamber is preferably made from transparent polymeric materials allowing the user to observe the level of fluid in the chamber. Furthermore, the use of differently colored materials enhancing the aesthetic appeal of brush 10 is also envisioned within the scope of the invention Dispensing of fluid from housing 12 through the outlet port is realized by a valve assembly 100 detachably coupled to the outlet port of housing 12. Referring to FIG. 4, valve assembly 100 includes a valve member 44, a holder 50 and a cover 90. Valve assembly 100 is installed by initially placing valve member 44 into holder 50. Then, the assembled holder/valve unit is inserted through the outer end of flange 70 of the housing portion 20. Flange 70 and holder 50 are dimensioned so that upon insertion of the holder, their inner or top end are substantially flush with the inner surface of the bottom of housing portion 20, whereas the bottom or outer end of holder 50 is received within a seat formed in the outer discharge end of flange 70 (FIG. 3). Once the assembled holder/membrane unit is placed within flange 70, cover 90 is screwed onto the outer surface of flange 70 to prevent displacement of the valve unit from housing 12.

As the inner threaded surface of cover 90 engages the threaded outer surface of flange 70, the inner end of the cover moves within a groove 77 (FIG. 3) formed in the bottom of base portion 60. Displacement of the cover continues until its inner or top end abuts the outer side of the bottom of housing portion 20. Instead of screwing cover 90, it is possible to select dimensions of the cover and flange 70 so that the cover simply slides along the flange in a manner preventing its voluntary displacement in the opposite direction.

Holder 50 (FIG. 4) (shown in an inverted position) has a cup-shaped body and a rim 52 spaced from the top of holder 50 and extending radially outwards from the body. The top of holder 50 is provided with multiple angularly extending recesses 54, which are separated from one another by a plurality of radially extending ribs 56. Valve member 44 is also provided with a cup-shaped body and a respective collar 40 juxtaposed with the underside of rim 52 of holder 50 upon insertion of valve member 44 into the holder. Valve member 44 is dimensioned so that its top 42 is pressed against an underside 58 of the holder's top and covers recesses 54. At least one slit, but preferably a multiplicity of slits 46, is formed in the top of valve member 44 defining, thus, at least two top segments 48. Due to the elasticity of the valve member, segments 48 are tightly attached to one another preventing fluid from escaping the chamber of housing portion 20. However, once the pressure within the chamber is increased in response to an external pressure exerted upon the bladder 24 (FIG. 3), the top segments deflect from one another to define a passage for fluid therebetween. Consequently, fluid exits an opening 92 formed in the bottom of cover 90 (FIG. 4).

In accordance with a further aspect of the invention, a kit may be provided containing brush unit 10 and a plurality of brush heads 82. Each of the heads 82 may be used for a respective surface. Dealing with animals, for example, bristles 84 may be relatively large for long-coat animals, whereas short-coat animals can be treated with relatively small bristles. Furthermore, the bristles 84 may be arranged in different patterns and have different dimensions. The user may decide which one of the purchased heads is most suitable for any given surface and easily attach the desired head to housing 12 of brush unit 10.

The specific features described herein may be used in some embodiments, but not in others, without departure from the spirit and scope of the invention as set forth. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention.

What is claimed is:

1. A brush for shampooing a fur of an animal, the brush comprising:
    an ergonomic housing having a first and a second housing portion, a first housing portion comprising an inner chamber fillable with a cleaning fluid and being received in the second housing portion, the housing has a top portion provided with the inlet port unit and a base portion provided with a valve assembly, the top and base portions being sealingly coupled to one another, the top portion is formed with the chamber and provided with the outlet flange, the base portion of the housing having a recess traversed by the outlet flange upon coupling the top and bottom portions together, the top and base portions are shaped so as to define a dome-shaped cross-section of the housing upon coupling with one another;
    an outlet port unit in the first housing portion and in flow communication with the chamber, the outlet port unit being operable to discharge the fluid from the chamber upon applying an external force to the housing; the outlet port unit received in an opening in the second housing portion, the outlet port unit comprising the valve assembly configured to provide a discharge of the fluid from the outlet opening upon applying the external force to the housing and to prevent the discharge of the fluid upon removing the external force;
    a unitary brush head comprising a plurality of bristles disposed on a bottom of the second housing portion, the plurality of bristles surrounding the outlet port unit and guiding the discharged fluid to a surface to be treated, the bristles are configured to have a pin-shape, a base of each bristle is wider than its tip wherein the housing has an outlet flange defining a throughgoing outlet opening in flow communication with the chamber,
    a tray coextending with bottom surface of the bottom portion of the housing and having a tray opening, the tray opening being aligned with and traversed by the outlet flange.

2. The brush of claim 1, wherein the housing has a peripheral wall provided with an inlet throughgoing opening, the inlet opening being spaced from the outlet port unit.

3. The brush of claim 2, further comprising an inlet port unit mounted to the housing and configured to receive and guide the fluid through the inlet opening into the chamber, the inlet port unit comprising
    an inlet flange extending outward from the housing and surrounding the inlet opening, and
    a bladder removably mounted on the inlet flange and depressable in response to the external force applied to the bladder so as to pressurize the fluid in the chamber, wherein the outlet port unit is operable to meter the pressurized fluid from the chamber.

4. The brush of claim 3, wherein the inlet port unit further comprises a ring coupled to the inlet flange so as to prevent detachment of the bladder from the inlet flange.

5. The brush of claim 1, wherein the valve assembly comprises:
    a holder having a hollow body and displaceable from outside into the outlet flange,
    a valve member receivable in the hollow body of the holder and sealing the chamber, the valve member being operable to controllably discharge the fluid from the chamber upon applying the external force to the housing, and
    a cup-shaped cover surrounding the holder and detachably coupled to an outer surface of the outlet flange of the housing so as to prevent detachment of the holder and the valve member from the housing.

6. The brush of claim 5, wherein the outlet flange of the housing has a seat facing away from the chamber and receiving an inner end of the holder.

7. The brush of claim 6, wherein the valve member comprises
    a top adjacent to the chamber upon engaging the cover with the housing so that the discharge of the fluid is prevented from the chamber when the external force is not applied to the housing, and
    a flange spaced from the top,
    the hollow body of the holder having a rim extending radially outwards from the hollow body, the flange of the valve member being sandwiched between the bottom of the cover and the rim of the holder upon engaging the cover with the housing.

8. The brush of claim 7, wherein the top valve member comprises a plurality of segments, the segments being moveable away from one another so as to define at least one slit therebetween configured to discharge the fluid in response to applying the external force to the housing.

9. The brush of claim 8, wherein the bottom of the cover has a central opening in flow communication with the at least one slit upon applying the external force to the housing.

10. The brush of claim 1, wherein the tray has a circumferential ledge extending radially outwards from the bottom portion of the housing.

11. The brush of claim 10, further comprising a brush head coextending with a bottom of the tray and coupled thereto, the brush head having an opening aligned with the tray opening and traversed by the outlet flange.

* * * * *